United States Patent
Hsu et al.

(10) Patent No.: US 6,803,784 B2
(45) Date of Patent: Oct. 12, 2004

(54) MICROPROCESSOR USING AN INTERRUPT SIGNAL FOR TERMINATING A POWER-DOWN MODE AND METHOD THEREOF FOR CONTROLLING A CLOCK SIGNAL RELATED TO THE POWER-DOWN MODE

(75) Inventors: Jany-Yee Hsu, Yun-Lin Hsien (TW); Meng-Chow Jiang, Tai-Chung (TW)

(73) Assignee: Conwise Technology Corporation Ltd., Hsin-Chu (TW)

( * ) Notice: Subject to any disclaimer, the term of this patent is extended or adjusted under 35 U.S.C. 154(b) by 92 days.

(21) Appl. No.: 10/248,484

(22) Filed: Jan. 23, 2003

(65) Prior Publication Data

US 2004/0148535 A1 Jul. 29, 2004

(51) Int. Cl.⁷ ................................................. G06F 7/38
(52) U.S. Cl. .............................. 326/37; 326/93; 326/38
(58) Field of Search .............................. 326/37, 38, 93

(56) References Cited

U.S. PATENT DOCUMENTS 6,021,500 A * 2/2000 Wang et al. ................. 713/320
6,219,797 B1 * 4/2001 Liu et al. ..................... 713/500

\* cited by examiner

Primary Examiner—Anh Q. Tran
(74) Attorney, Agent, or Firm—Winston Hsu

(57) ABSTRACT

A microprocessor uses an interrupt signal for terminating a power-down mode, and a method thereof is used for controlling a clock signal related to the power-down mode. The microprocessor has a clock control unit for controlling whether a clock signal is outputted from a clock generator to the microprocessor, a first control unit which outputs a first control signal to the clock control unit when being level-triggered by an interrupt signal, and a second control unit which outputs a second control signal to the clock control unit for activating a power-down mode. The method includes (a) generating the second control signal to stop the clock generator from outputting the clock signal to the microprocessor, and (b) generating the interrupt signal to trigger the corresponding first control signal for terminating the power-down mode and actuating the clock generator to output the clock signal to the microprocessor after performing step (a).

16 Claims, 2 Drawing Sheets

MICROPROCESSOR USING AN INTERRUPT SIGNAL FOR TERMINATING A POWER-DOWN MODE AND METHOD THEREOF FOR CONTROLLING A CLOCK SIGNAL RELATED TO THE POWER-DOWN MODE

BACKGROUND OF INVENTION

1. Field of the Invention

The present invention relates to a microprocessor and a method thereof for controlling a clock signal, and more particularly, to a microprocessor and a method thereof for controlling a clock signal related to a power-down mode.

2. Description of the Prior Art

The prior art 8051 microcontroller architecture and 8052 microcontroller architecture are both produced by Intel®. The prior art microcontroller (microprocessor) is widely used as a control unit for many devices. It is well-known that the microprocessor itself is capable of performing power management including an idle mode and a power-down mode for reducing power consumption. Please refer to FIG. 1, which is a circuit diagram of a prior art microprocessor 20. The microprocessor 20 is electrically connected to an external clock generator 10. The clock generator 10 has an oscillator 12 (a crystal oscillator for example), and two capacitors 14 used to stabilize the clock signal outputted from the oscillator 12. The microprocessor 20 has a logic circuit 22, an interrupt control unit 24, an idle mode control unit 26, and a power-down mode control unit 28. The logic circuit 22 is used to perform a predetermined logic operation. The interrupt control unit 24 is used for receiving an external interrupt signal Int to activate a corresponding interrupt service routine (ISR). The idle mode control unit 26 is used to control operation of the idle mode including timing for activating the idle mode and terminating the idle mode. The idle mode control unit 26 has a flip-flop 30, and two logic gates 32, 34. The flip-flop 30 functions as a storage device used for holding a control bit IDL. That is, the logic value ("1" or "0") of the control bit IDL is used to determine whether the microprocessor 20 enters the idle mode or not. The power-down mode control unit 28 is used to control operation of the power-down mode including timing for activating the idle mode and terminating the power-down mode. The power-down mode control unit 28 has a flip-flop 36 and a logic gate 38. The flip-flop 36 functions as a storage device used for holding a control bit PD. That is, the logic value ("1" or "0") of the control bit PD is used to determine whether the microprocessor 20 enters the power-down mode or not. In addition, a hardware reset signal Rst is inputted into the, microprocessor 20 for resetting the microprocessor 20 to an initial state. For example, with regard to a walkie-talkie device that adopts the microprocessor 20 as a micro control unit (MCU), a user can press a power button of the walkie-talkie device to shut down the walkie-talkie device. Therefore, the walkie-talkie device begins entering the power-down mode. If the user wants to use the walkie-talkie device later, the user then presses the power button of the walkie-talkie device again to force a power supply device such as batteries to provide the walkie-talkie device with a proper operating voltage. At the same time, the hardware reset signal Rst is transmitted to the microprocessor 20 for forcing the microprocessor 20 to enter the initial state. Operation of the prior art microprocessor 20 is briefly described as follows. For instance, the initial states of the hardware reset signal Rst and the interrupt signal Int both correspond to a high logic value "1". When a hardware reset event or an interrupt event is triggered, the corresponding hardware reset signal Rst or the interrupt signal Int will transit from the initial high logic value "1" to the low logic value "0". In addition, when the control bit IDL corresponds to the low logic value "0", the control bit IDL is further transmitted to the logic gate 34 through the flip-flop 30. The logic gate 34 performs an NAND logic operation. When there is one input port corresponding to the low logic value "0", an output port of the logic gate 34 will keep the high logic value "1". Because another input port of the logic gate 34 is used to receive the clock signal generated from the clock generator 10, the clock signal is gated by the logic gate 34 from driving the logic circuit 22. It is well-known that the microprocessor 20 uses an edge-trigger means, and works properly according to the clock signal. Therefore, the logic circuit 22 stops working and interrupts current running logic operation without the driving clock signal. That is, the logic gate 34 functions as a clock control unit for controlling the clock signal inputted into the logic circuit 22. At the same time, the microprocessor 20 enters the idle mode. Even though the microprocessor 20 enters the idle mode, the clock signal generated from the clock generator 10 still drives the interrupt control unit 24. If an interrupt event occurs and triggers the interrupt signal Int to transit from the initial high logic value "1" to the low logic value "0", the interrupt control unit 24 accordingly outputs a signal with the low logic value "0" to the logic gate 32, which performs an AND logic operation, for resetting the control bit IDL. That is, the control bit IDL corresponds to the original high logic value "1". At the same time, the interrupt control unit 24 will activate a corresponding ISR. From an operation result of the logic gate 34, it is obvious that the clock signal is capable of driving the logic circuit 22. After the ISR is finished, the interrupt control unit 24 informs the logic circuit 22 to continue running the interrupted logic operation caused by the idle mode. In other words, the idle mode will be terminated after the interrupt event occurs. The control bit PD is an input port of the logic gate 38. When the control bit PD is set by the low logic value "0", the logic gate 38, which performs an NAND logic operation, will keep its output port at the high logic value "1". The clock signal generated from the clock generator 10 that connected to the logic gate 38 is gated by the logic gate 38. After a period of time, the clock generator 10 stops generating the clock signal, and is no longer capable of driving the microprocessor 20. That is, the logic gate 38 functions as a clock control unit for control clock signal inputted into the microprocessor 20. When a hardware reset event occurs for restarting the microprocessor 20 to its initial state, the hardware reset signal Rst transits from original high logic value "1" to a low logic value "0". The flip-flop 36 simultaneously reset the control bit PD by the initial high logic value "1". Therefore, the microprocessor 20 escapes from the power-down mode.

As mentioned above, when the microprocessor 20 enters the idle mode, the logic circuit 22 interrupts current running logic operation owing to the required clock signal being cut. However, operational data related to the unfinished logic operation are kept in buffers, and the operational data can be accessed by the interrupted logic operation after the idle mode is terminated. Because the logic circuit 22 cannot work without the clock signal, the power consumption of the microprocessor 20 is reduced under the idle mode. In order to revive the microprocessor 20, the interrupt control unit 24 plays a key role. Under the idle mode, the clock signal generated from the clock generator 10 still drives the interrupt control unit 24. Therefore, when an interrupt event occurs to trigger the interrupt signal Int, the running interrupt control unit 24 is capable of rescuing the microprocessor 20 from the idle mode. The logic circuit 22, therefore, can continue running the logic operation previously interrupted by the idle mode. However, the clock generator 10 continuously generates the clock signal under the idle mode. During the execution of the idle mode, the clock generator 10 consumes much power, and the running circuit element such as the interrupt control unit still driven by the clock signal 24 consumes much power as well. On the contrary, with regard to the power-down mode of the microprocessor 20, the clock generator 10 stops outputting the clock signal. All of the circuit elements driven by the clock signal are interrupted. In other words, overall power consumption is greatly reduced under the power-down mode. However, the important difference between the idle mode and the power-down mode is that the microprocessor 20 entering the power-down mode cannot revive to continue running the interrupted logic operation. In other words, if the hardware reset event is activated to rescue the microprocessor 20 from the power-down mode, the microprocessor 20 regains its initial setting by flushing current data stored in buffers. The power-down mode compared with the idle mode is capable of saving much more power, but the microprocessor 20 cannot finish the interrupted logic operation to acquire a desired result after termination of the power-down mode.

SUMMARY OF INVENTION

It is therefore a primary objective of the claimed invention to provide a method for controlling a clock signal when a corresponding microprocessor enters a power-down mode. According to the claimed invention, the microprocessor can continue running the interrupted logic operation after the power-down mode is terminated.

According to the claimed invention, a method for controlling a clock signal of a microprocessor is disclosed. The microprocessor is connected to a clock generator, and the clock generator generates the clock signal for driving the microprocessor. The microprocessor has a clock control unit, a first control unit, and a second control unit. The clock control unit is electrically connected to the clock generator for controlling whether the clock generator outputs the clock signal to the microprocessor. The first control unit is electrically connected to the clock control unit, and the first control unit generates a level-trigger and outputs a first control signal to the clock control unit when receiving an interrupt signal inputted into the microprocessor. The second control unit is electrically connected to the clock control unit, and the second control unit outputs a second control signal to the clock control unit when the microprocessor enters a power-down mode. The method includes (a) the second control unit outputting the second control signal to the clock control unit for disabling the clock generator from generating the clock signal to the microprocessor so as to activate the power-down mode; and after performing step (a), inputting the interrupt signal to the first control unit for driving the first control unit to generate the level-trigger and driving the first control unit to output the first control signal to the clock generator so as to restart the clock generator to generate the clock signal.

The claimed invention further provides a microprocessor. The microprocessor is connected to a clock generator, and the clock generator generates a clock signal for driving the microprocessor. The microprocessor has a clock control unit, a first control unit, and a second control unit. The clock control unit is electrically connected to the clock generator for controlling whether the clock generator outputs the clock signal to the microprocessor. The first control unit is electrically connected to the clock control unit, and the first control unit generates a level-trigger and outputs a first control signal to the clock control unit when receiving an interrupt signal inputted into the microprocessor. The second control unit is electrically connected to the clock control unit, and the second control unit outputs a second control signal to the clock control unit when the microprocessor enters a power-down mode. The second control unit is capable of outputting the second control signal to the clock control unit for disabling the clock generator from generating the clock signal to the microprocessor so as to activate the power-down mode, and the first control unit is capable of receiving the interrupt signal for driving the first control unit to generate the level-trigger and driving the first control unit to output the first control signal to the clock generator so as to restart the clock generator to generate the clock signal.

It is an advantage over the prior art that the claimed invention not only has low power consumption because of entering the prior art power-down mode, but also can continue running the interrupted logic operation after the power-mode is ended. In conclusion, the claimed microprocessor has the advantage of the prior art power-down mode for greatly reducing power consumption and the advantage of the prior art idle mode for continuing the interrupted operation after the idle mode is ended.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 1:
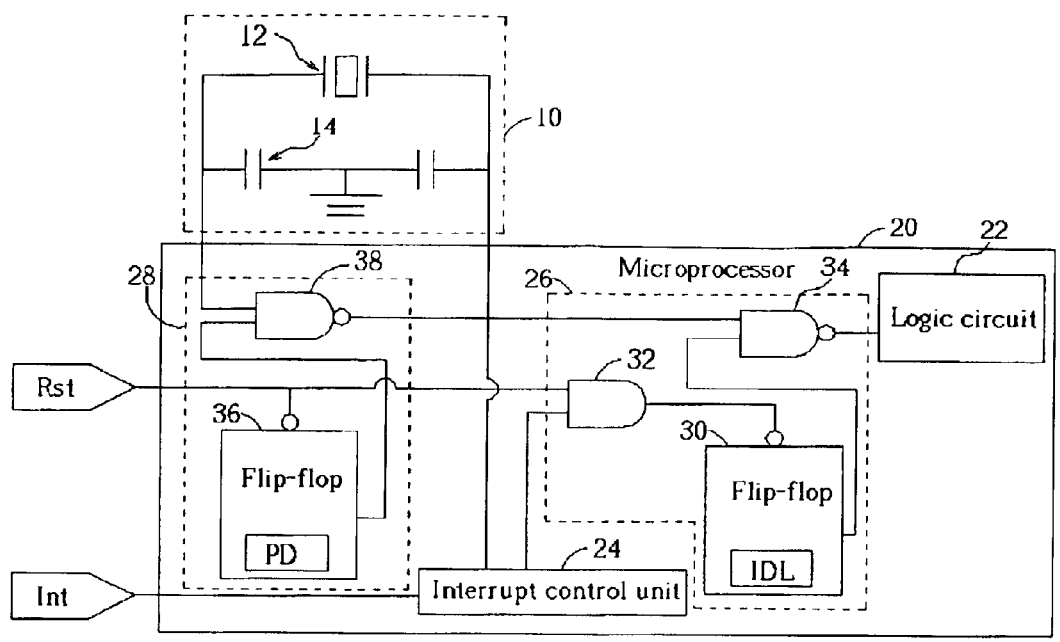
FIG. 1 is a circuit diagram of a prior art microprocessor.
Figure 2:
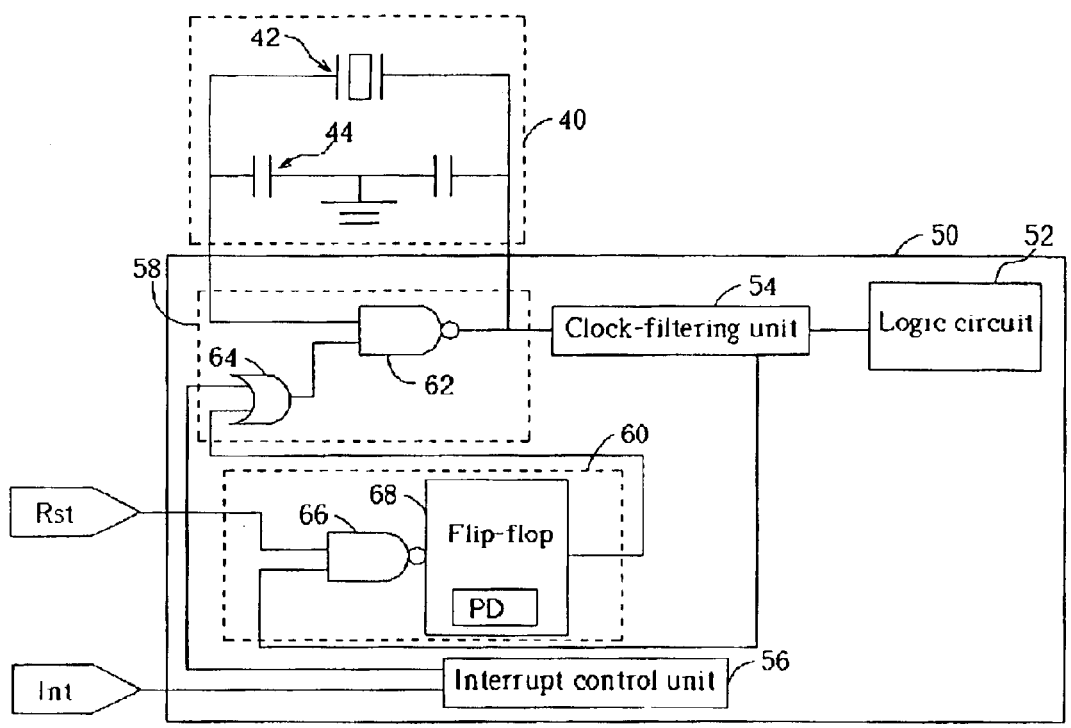
FIG. 2 is a circuit diagram of a microprocessor according to the present invention.

Please refer to FIG. 2, which is a circuit diagram of a microprocessor 50 according to the present invention. The microprocessor 50 is electrically connected to a clock generator 40. The clock generator 40 has an oscillator 42 for generating a clock signal, and two capacitors 44 for stabilizing output of the oscillator 42. The microprocessor 50 according to the present invention includes a logic circuit 52, a clock-filtering unit 54, an interrupt control unit 56, a clock control unit 58, and a power-down mode control unit 60. The logic circuit 52 is used to perform a predetermined logic operation. The clock-filtering unit 54 is used to filter out the unstable clock signal outputted from the clock generator 40 so as to pass stable clock signal to the logic circuit 52. For example, when the oscillator 42 starts generating an oscillating signal, the frequency of the oscillating signal is not stable in the beginning so that the related clock signal is unstable as well. If the logic circuit 52 works according to the unstable clock signal, unwanted and unexpected results might be generated owing to the erroneous timing. The clock-filtering unit 54, therefore, is introduced to filter out the unstable clock signal during a period of time until the clock signal has a stable frequency, the clock-filtering unit 54 then passes the stable clock signal to the logic circuit 52. The interrupt control unit 56 actuates an interrupt service routine (ISR) corresponding to a triggered interrupt signal Int. The clock control unit 58 is used to control whether the clock generator 40 outputs the clock signal to the microprocessor 50. The clock control unit 58 has logic gates 62 and 64. The power-down mode control unit 60 is used to set logic value of a control bit PD so as to control operation of the power-down mode. The power-down mode control unit 60 has a logic gate 66 and a flip-flop 68. The flip-flop 68 functions as a storage device used for holding the control bit PD. In addition, a hardware reset signal Rst is inputted to the microprocessor 50 for resetting the microprocessor 50 to have its initial state. The operation of the microprocessor 50 running the power-down mode is explained as follows. For instance, each of the hardware reset signal Rst and the interrupt signal Int is initialized to correspond to the high logic value "1". That is, when a hardware reset event or an interrupt event occurs, the hardware reset signal Rst or the interrupt signal Int will transit from the high logic value "1" to a low logic value "0". If the microprocessor 50 enters the power-down mode to reduce power consumption, the control bit is set by the low logic value "0". In the preferred embodiment, it is noteworthy that the interrupt control unit 56 utilizes a level trigger means to detect whether an external interrupt event is started to trigger a corresponding interrupt signal Int after the microprocessor 50 enters the power-down mode. If the external interrupt event is not started yet, the interrupt signal Int will hold the initial high logic value P "1", and the interrupt control unit 56 outputs a signal with the low logic value "0" to the clock control unit 58. In other words, after the power-down mode is started, output of the logic gate 64, which performs an OR logic operation, corresponds to the low logic value "0". However, the logic gate 62 performs an NAND logic operation, and output of the logic gate 62 corresponds to the high logic value "1" when one input port of the logic gate 62 receives a signal with the low logic value "0". As mentioned above, the clock signal outputted from the clock generator 10 is gated from being inputted to the microprocessor 50 for driving any circuit elements. At the same time, the running predetermined logic operation is interrupted, and data related to the interrupted logic operation are kept in buffers. However, when the interrupt event occurs to trigger the corresponding interrupt signal Int, the interrupt signal Int transits from the high logic value "1" to the low logic value "0". Because the interrupt signal Int has a logic value transition, the interrupt control unit 56 is level-trigged to output a signal with the high logic value "1" to the logic gate 64. Thought the control bit PD still corresponds to the low logic value "0", the output of the logic gate 64 will transit from the low logic value "0" to the high logic value "1", and the outputted logic value "1" is then transmitted to another logic gate 62. Now, the clock control unit 58 no longer restrains the clock generator 40 from generating the clock signal. The oscillator 42 then starts generating an oscillating signal used to form the clock signal. It is well-known that the clock generator 40 cannot generate a stable clock signal in the beginning. As mentioned before, the clock-filtering unit 54 is capable of filtering out the initially inputted clock signal for a period of time until the clock signal approaches a stable status. While the stable clock signal passes the clock-filtering unit 54, and is inputted to the logic circuit 52, the clock-filtering unit 54 simultaneously outputs a signal with the high logic value "1" to the logic gate 66 of the power-down mode control unit 60. It is noteworthy that there is no hardware reset event to trigger the corresponding hardware reset signal Rst, and the hardware reset signal Rst keeps its initial high logic value "1". Therefore, the logic gate 66, which performs a AND logic operation, will reset the control bit PD within the flip-flop 68. That is, the control bit PD transits from the low logic value to the initial high logic value "1" for terminating the power-down mode. At the same time, when the ISR corresponding to the interrupt signal Int is finished, the logic circuit 52 driven by the regenerated clock signal is then capable of accessing data stored in buffers to continue running the predetermined logic operation interrupted by the execution of the power-down mode. To sum up, the preferred embodiment adopts the interrupt signal Int to rescue the microprocessor 50 from the power-down mode, and the revived microprocessor 50 then continues running the predetermined logic operation previously interrupted by the execution of the power-down mode.

The hardware reset signal Rst in the preferred embodiment like the prior art hardware reset signal is used to reset the microprocessor 50 to its initial state. However, the hardware reset signal Rst in the preferred embodiment is not used to terminate the power-down mode. Actually, the power-down mode is terminated by an external interrupt signal Int according to the present invention. In other words, when the power-down mode is ended in the preferred embodiment, the claimed microprocessor 50 does not return to its initial state by flushing any temporary data stored in buffers. On the contrary, the clock generator 40 is restarted to generate the clock signal after the termination of the power-down mode. The claimed microprocessor 50 then is capable of accessing the temporary data previously stored in buffers to continue running the interrupted predetermined logic operation. In addition, the clock control unit 58 in the preferred embodiment is used as a clock-gating unit for gating the clock signal from driving the microprocessor 50. In the preferred embodiment, any logic gates with specific logic operations such as an AND logic operation, an OR logic operation, an NAND logic operation, an NOR logic operation, and an XOR logic operation can be appropriately combined together to achieve the objective of gating clock signals. Similarly, combination of different logic gates can be used to replace the power-down mode control unit 60 shown in FIG. 2 to achieve the same function.

In contrast to the prior art microprocessor, the claimed microprocessor, which is compatible with the well-known 8051 microcontroller architecture or the 8052 microcontroller architecture, uses a control bit PD and an interrupt signal Int to control the prior art power-down mode and a corresponding clock signal. When the claimed microprocessor enters the power-down mode, the claimed microprocessor interrupts a predetermined logic operation owing to the halted clock signal. Then, the claimed microprocessor escapes from the power-down mode through the interrupt signal Int. In addition, when a clock generator is restarted to regenerate the clock signal, the claimed microprocessor utilizes a clock-filtering unit to filter out unstable clock signals during a predetermined period of time for preventing the logic circuit of the claimed microprocessor from outputting unexpected results. When the clock is stable to have a fixed frequency, the claimed microprocessor can continue running the predetermined logic operation interrupted by the execution of the power-down mode. Therefore, the claimed microprocessor not only has low power consumption because of entering the prior art power-down mode, but also can continue running the interrupted logic operation after the power-mode is ended. The claimed microprocessor has the advantage of the prior art power-down mode for greatly reducing power consumption and the advantage of the prior art idle mode for continuing the interrupted operation after the idle mode is ended.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A method for controlling a clock signal of a microprocessor, the microprocessor being connected to a clock generator, the clock generator generating the clock signal for driving the microprocessor, the microprocessor comprising:

a clock control unit electrically connected to the clock generator for controlling whether the clock generator outputs the clock signal to the microprocessor;

a first control unit electrically connected to the clock control unit, the first control unit generating a level-trigger and outputting a first control signal to the clock control unit when receiving an interrupt signal inputted into the microprocessor; and a second control unit electrically connected to the clock control unit, the second control unit outputting a second control signal to the clock control unit when the microprocessor enters a power-down mode;

the method comprising:

(a) the second control unit outputting the second control signal to the clock control unit for disabling the clock generator from generating the clock signal to the microprocessor so as to activate the power-down mode; and (b) after performing step (a), inputting the interrupt signal to the first control unit for driving the first control unit to generate the level-trigger and driving the first control unit to output the first control signal to the clock generator so as to restart the clock generator to generate the clock signal.

2. The method of claim 1 wherein the microprocessor further comprises a logic circuit for performing a predetermined logic operation and a clock-filtering unit electrically connected between the clock control unit and the logic circuit; the method further comprising:

after the clock generator restarts, using the clock-filtering unit to filter out the clock signal within a predetermined period of time until the clock signal approaches a stable state, and the clock-filtering unit then transmitting the clock signal received from the clock generator to the logic circuit.

3. The method of claim 2 further comprising the clock-filtering unit generating a third control signal to the second control unit for driving the second control unit to reset the second control signal to an initial logic level when the clock signal approaches the stable state.

4. The method of claim 2 wherein an interrupt service routine (ISR) is started after the first control unit receives the interrupt signal, and the logic circuit is capable of continuing to perform the predetermined logic operation after the ISR is finished.

5. The method of claim 4 further comprising the first control unit resetting the first control signal to an initial logic level after the ISR is finished.

6. The method of claim 1 wherein the second control unit is used for receiving a hardware reset signal, and the hardware reset signal is used for resetting the microprocessor to an initial state; the method further comprising the second control unit resetting the second control signal to an initial logic state after the second control unit receives the hardware reset signal.

7. The method of claim 1 wherein the microprocessor is compatible with an 8051 microcontroller architecture.

8. The method of claim 1 wherein the microprocessor is compatible with an 8052 microcontroller architecture.

9. A microprocessor being connected to a clock generator, the clock generator generating a clock signal for driving the microprocessor, the microprocessor comprising:

a clock control unit electrically connected to the clock generator for controlling whether the clock generator outputs the clock signal to the microprocessor;

a first control unit electrically connected to the clock control unit, the first control unit generating a level-trigger and outputting a first control signal to the clock control unit when receiving an interrupt signal inputted into the microprocessor; and a second control unit electrically connected to the clock control unit, the second control unit outputting a second control signal to the clock control unit when the microprocessor enters a power-down mode;

wherein the second control unit is capable of outputting the second control signal to the clock control unit for disabling the clock generator from generating the clock signal to the microprocessor so as to activate the power-down mode, and the first control unit is capable of receiving the interrupt signal for driving the first control unit to generate the level-trigger and driving the first control unit to output the first control signal to the clock generator so as to restart the clock generator to generate the clock signal.

10. The microprocessor of claim 9 further comprising a logic circuit for performing a predetermined logic operation and a clock-filtering unit electrically connected between the clock control unit and the logic circuit; wherein after the clock generator restarts, the clock-filtering unit filters out the clock signal within a predetermined period of time until the clock signal approaches a stable state, and then the clock-filtering unit is capable of transmitting the clock signal received from the clock generator to the logic circuit.

11. The microprocessor of claim 10 wherein the clock-filtering unit is capable of generating a third control signal to the second control unit for driving the second control unit to reset the second control signal to an initial logic level when the clock signal approaches the stable state.

12. The microprocessor of claim 10 wherein an interrupt service routine (ISR) is started after the first control unit receives the interrupt signal, and the logic circuit is capable of continuing to perform the predetermined logic operation after the ISR is finished.

13. The microprocessor of claim 12 wherein the first control unit is capable of resetting the first control signal to an initial logic level after the ISR is finished.

14. The microprocessor of claim 9 wherein the second control unit is used for receiving a hardware reset signal, the hardware reset signal is used for resetting the microprocessor to an initial state, and the second control unit is capable of resetting the second control signal to an initial logic state after the second control unit receives the hardware reset signal.

15. The microprocessor of claim 9 being compatible with an 8051 microcontroller architecture.

16. The microprocessor of claim 9 being compatible with an 8052 microcontroller architecture.

* * * * *